United States Patent [19]

Sturm et al.

[11] Patent Number: 5,280,071
[45] Date of Patent: Jan. 18, 1994

[54] HIGH MOLECULAR WEIGHT AMINE CONTAINING ANTIOZONANTS

[75] Inventors: Budd H. Sturm, Hartville; Joseph A. Kuczkowski, Munroe Falls; Paul H. Sandstrom, Tallmadge; George F. Balogh, North Canton, all of Ohio

[73] Assignee: The Goodyear Tire & Rubber Company, Akron, Ohio

[21] Appl. No.: 680,871

[22] Filed: Apr. 5, 1991

[51] Int. Cl.$^5$ .................. C08L 61/20; C08L 61/32
[52] U.S. Cl. ............................ 525/164; 525/157; 525/177; 525/64; 525/69; 525/98; 525/95; 525/509; 525/518; 525/154
[58] Field of Search ............... 525/154, 164, 157, 177, 525/64, 69, 98, 95, 509, 518

[56] References Cited

U.S. PATENT DOCUMENTS

| | | | |
|---|---|---|---|
| 1,890,916 | 12/1932 | Semon . | |
| 3,409,586 | 11/1968 | Oberster | 524/246 |
| 3,424,713 | 1/1969 | Oberster et al. | 525/332.7 |
| 3,432,460 | 3/1969 | Spacht | 524/255 |
| 3,504,032 | 3/1970 | Altwicker | 524/258 |
| 3,634,248 | 1/1972 | Andress, Jr. | 252/51.5 A |
| 3,663,505 | 5/1972 | Hoffman | 524/254 |
| 3,785,995 | 1/1974 | Kalil | 524/255 |
| 3,839,275 | 10/1974 | Wilder | 524/255 |
| 4,124,565 | 11/1978 | Kuczkowski | 260/45.9 QB |
| 4,167,526 | 9/1979 | Farthing et al. | 260/570.5 P |
| 4,186,105 | 1/1980 | Bonsall et al. | 252/400 R |
| 4,426,475 | 1/1984 | Brassat et al. | 524/255 |

FOREIGN PATENT DOCUMENTS 1123103  2/1962  Fed. Rep. of Germany .
2538181  9/1974  Fed. Rep. of Germany .
2729363  6/1977  Fed. Rep. of Germany .

Primary Examiner—James J. Seidleck
Assistant Examiner—W. R. H. Clark
Attorney, Agent, or Firm—Bruce J. Hendricks

[57] ABSTRACT

The present invention relates to a composition which exhibits antiozonant activity in diene containing rubbers comprising the reaction product of a multi-step process comprising:

(1) reacting under condensation conditions an aldehyde and an amine containing compound to form a condensation product, wherein
said aldehyde is selected from the group consisting of formaldehyde, acetaldehyde or mixtures thereof; and
said amine containing compound is selected from the group consisting of:
N,N'-di-substituted-p-phenylene diamines of the structural formula:

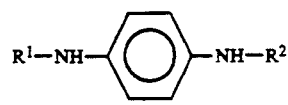

wherein $R^1$ and $R^2$ are independently selected from the group of radicals consisting of alkyls having 3 to 12 carbon atoms, aryls having 6 to 12 carbon atoms and aralkyls having 7 to 12 carbon atoms; and wherein said condensation conditions include:
(i) the presence of an acid catalyst,
(ii) a mole ratio of aldehyde to amine containing compound ranging from about 1.01:2 to 2:1, and
(iii) said amine containing compound is dissolved in an organic solvent;

(2) removing water from said condensation product;
(3) adjusting the pH of the condensation reaction product to above 7 to form a basic reaction mixture;
(4) filtering off neutralized catalyst to form a solvent reaction mixture;
(5) heating said solvent reaction mixture under vacuum to a temperature ranging from about 110° C. to 250° C.;
(6) isolating from the heated solvent reaction mixture the reaction product which exhibits antiozonant activity in diene containing rubbers.

7 Claims, No Drawings

HIGH MOLECULAR WEIGHT AMINE CONTAINING ANTIOZONANTS

BACKGROUND OF THE INVENTION

Amine containing antiozonants are commonly used in diene rubbers to avoid degradation through ozonolysis and oxidation. Common examples of such amine containing compounds are antiozonants such as N,N'-di-substituted-p-phenylene diamines. In the business of manufacturing rubber products, such as tires, there have been monumental gains in rubber chemistry which have extended the product's useful life. This extension has increased the demands placed on antiozonants. Therefore, there is a continuing need for superior antiozonants to further prolong the useful life of these rubber products.

SUMMARY OF THE INVENTION

The present invention relates to a composition comprising a high molecular weight amine containing antiozonant that is prepared in a multi-step process.

DETAILED DESCRIPTION OF THE INVENTION

There is disclosed a composition which exhibits antiozonant activity in diene containing rubbers comprising the reaction product of a multistep process comprising:
(1) reacting under condensation conditions an aldehyde and an amine containing compound to form a condensation product wherein
said aldehyde is selected from the group consisting of formaldehyde, acetaldehyde or mixtures thereof; and
said amine containing compound is selected from the group consisting of:
N,N'-di-substituted-p-phenylene diamines of the structural formula:

wherein $R^1$ and $R^2$ are independently selected from the group of radicals consisting of alkyls having 3 to 12 carbon atoms, aryls having 6 to 12 carbon atoms and aralkyls having 7 to 12 carbon atoms; and wherein said condensation conditions include:
(i) the presence of an acid catalyst,
(ii) a mole ratio of aldehyde to amine containing compound ranging from about 1.01:2 to 2:1, and
(iii) said amine containing compound is dissolved in an organic solvent;
(2) removing the water from said condensation product;
(3) adjusting the pH of the condensation reaction product to above 7 to form a basic reaction mixture;
(4) filtering off neutralized catalyst to form a solvent reaction mixture;
(5) heating said solvent reaction mixture under vacuum to a temperature ranging from about 110° C. to 250° C.;
(6) isolating from the solvent reaction mixture the reaction product which exhibits antiozonant activity in diene containing rubbers.

There is also disclosed a process for decreasing the degradation of a diene containing rubber comprising admixing a rubber selected from the group consisting of natural rubber, homopolymers of conjugated diolefins, copolymers of conjugated diolefins and ethylenically unsaturated monomers or mixtures thereof with the high molecular weight amine containing antiozonant of the present invention.

There is also disclosed a rubber compound which comprises:
(1) a rubber selected from the group consisting of natural rubber, homopolymers of conjugated diolefins, copolymers of conjugated diolefins and ethylenically unsaturated monomers or mixtures thereof; and
(2) the reaction product of a multi-step process comprising:
reacting under condensation conditions an aldehyde and an amine containing compound to form a condensation product, wherein
said aldehyde selected is from the group consisting of formaldehyde, acetaldehyde or mixtures thereof; and
said amine containing compound is selected from the group consisting of
N,N'-di-substituted-p-phenylene diamines of the structural formula:

wherein $R^1$ and $R^2$ are independently selected from the group of radicals consisting of alkyls having 3 to 12 carbon atoms, aryls having 6 to 12 carbon atoms and aralkyls having 7 to 12 carbon atoms; and wherein said condensation conditions include:
(i) the presence of an acid catalyst,
(ii) a mole ratio of aldehyde to amine containing compound ranging from about 1.01:2 to 2:1, and
(iii) said amine containing compound is dissolved in an organic solvent;
(2) removing water from said condensation product;
(3) adjusting the pH of the condensation reaction product to above 7 to form a basic reaction mixture;
(4) filtering off neutralized catalyst to form a solvent reaction mixture;
(5) heating said solvent reaction mixture under vacuum to a temperature ranging from about 110° C. to 250° C.;
(6) isolating from the heated solvent reaction mixture the react4.on product which exhibits antiozonant activity in diene containing rubbers.

The composition of the present invention is prepared by reacting an aldehyde selected from the group consisting of formaldehyde, acetaldehyde or mixtures thereof with an amine containing compound described above. The formaldehyde may be free formaldehyde, for example, paraformaldehyde. In the alternative, the source of the formaldehyde may be an aqueous solution, such as a 37% by weight aqueous solution known as formalin.

Specific amines which may be used to react with the aldehyde include N,N'-diphenyl-p-phenylenediamine, N,N'-bis-(1-methylheptyl)-p-phenylenediamine, N,N'-bis(1-ethyl-3-methylpentyl)-p-phenylenediamine, N,N'-bis(1,4-dimethylpentyl)-p-phenylenediamine, N,N-di-beta-naphthyl-p-phenylenediamine, N-o-tolyl-N'-phenyl-p-phenylenediamine, N,N-di-p-tolyl-p-phenylenediamine, N-1,3-dimethylbutyl-N'-phenyl-p-phenylenediamine, N-1,4-dimethylpentyl-N'-phenyl-p-phenylenediamine, N-isopropyl-N'-phenyl-p-phenylenediamine, N-1-methylpropyl-N'-phenyl-p-phenylenediamine, N-cyclohexyl-N'-phenyl-p-phenylenediamine, N,N'-bis-(1-ethyl-3-methylpentyl)-p-phenylenediamine, N,N'-bis-(1,4-dimethylpentyl)-p-phenylenediamine, and N,N'-bis-(1-methylpropyl)-p-phenylenediamine.

The aldehyde is reacted with the amine containing compound under suitable conditions conducive to a condensation reaction. The reaction product will consist of a number of amine containing compounds, all of which vary in molecular weight. The molecular weight of the components of the reaction product obviously will vary depending on the particular amine containing compound that is selected, particular aldehyde, ratio of reactants, catalyst, amount of catalyst, temperature of the reaction and reaction time. The molecular weight of the composition of the present invention may range from about 378 to about 20,000. Preferably, the molecular weight will range from about 2,000 to about 10,000.

The mole ratio of aldehyde to amine containing compound may range from about 1.01:2 to 2:1. Preferably, the mole ratio ranges from about 1.25:2 to 1.75:1.

The condensation reaction is conducted in the presence of a catalyst to speed up the reaction. Examples of catalysts that may be used include acid catalysts such as sulfuric acid, methane sulfonic acid, hydrochloric acid, xylene sulfonic acid and toluene sulfonic acid. The amount of catalyst that may be used will vary depending on the particular catalyst that is selected. For example, the acid catalyst should range from about 0.01 to about 100 grams per mole of amine. Preferably from about 1 to about 10 grams of acid catalyst is used per mole of amine.

The condensation reaction may be conducted over wide temperatures. The condensation reaction is an exothermic reaction and may be conducted at temperatures ranging from moderate to an elevated temperature. In general, the condensation reaction may be conducted at a temperature of between about 5° C. to about 150° C. Preferably, the condensation reaction is conducted at a temperature ranging from about 20° C. to about 125° C.

An organic solvent should be used to dissolve the amine containing compound for subsequent reaction with the aldehyde. The solvent is preferably inert to the condensation reaction. Illustrative of solvents suitable for use in the present invention include: saturated and aromatic hydrocarbons, e.g., hexane, octane, dodecane, naphtha, decalin, tetrahydronaphthalene, kerosene, mineral oil, cyclohexane, cycloheptane, alkyl cycloalkane, benzene, toluene, xylene, alkyl-naphthalene, and the like; ethers such as tetrahydrofuran, diethylether, 1,2-dimethoxybenzene, 1,2-diethoxybe-nzene, the mono- and dialkylethers of ethylene glycol, propylene glycol, butylene glycol, diethylene glycol, dipropylene glycol, oxyethyleneoxypropylene glycol and the like; fluorinated hydrocarbons that are inert under the reaction conditions such as perfluoroethane, monofluorobenzene, alkyl alcohols such as reethanol, ethanol, and the like. Another class of solvents are sulfones such as dimethylsulfone, diethylsulfone, diphenolsulfone, sulfolane, and the like. Mixtures of the aforementioned solvents may be employed so long as they are compatible with each other under the conditions of the reaction and will adequately dissolve the amine containing compound and not interfere with the condensation reaction.

The condensation reaction may be conducted under a variety of pressures. Atmospheric pressures is preferred.

The condensation reaction is conducted for a period time sufficient to produce the desired condensation product which upon subsequent heating and isolation will result in a higher molecular weight antiozonant. In general, the condensation reaction time may vary from minutes to several hours. If the more sluggish reaction conditions are selected, then the reaction time will have to be extended until the desired product is produced. It is appreciated that the residence time of the reactants will be influenced by the reaction temperature, concentration and choice of reactants, catalyst, concentration and choice of solvent, and other factors. Desirably, the condensation reaction is conducted until the theoretical water of reaction is produced.

Upon termination of the condensation reaction, the condensation product is heated in order to remove the water of reaction. The condensation product may be heated by such conventional methods as known to those skilled in the art. As can be appreciated, the temperature should exceed 100°.

Upon removal of the water of reaction, the pH of the residual condensation reaction product is adjusted to a basic pH. Therefore, the pH is raised to a range above 7. Preferably, the pH of the residual condensation reaction ranges from about 9 to about 11. Suitable agents which may be used to adjust the pH include aqueous solutions of sodium carbonate, sodium hydroxide, potassium hydroxide, calcium oxide, calcium hydroxide, sodium carbonate, potassium carbonate and the like. Preferably, sodium carbonate is used.

After the reaction mixture has been rendered basic, any aqueous layer from the agent to render the mixture basic is removed and the organic layer is heated to remove the last traces of water and filtered hot to remove all traces of neutralized catalyst.

After removal of the catalyst, the organic layer or solvent containing the reactants is heated to a temperature ranging from about 110° C. to 250° C. under vacuum. Preferably, the solvent reaction mixture is heated to a temperature ranging from about 150° C. to about 200° C. The purpose of the heating step is to strip off the organic solvent under vacuum and the possible rearrangement of the condensation reaction product to form the composition of the present invention.

The heating of the solvent reaction mixture may be conducted under a variety of pressures. Pressures ranging from about 0 psig to 100 psig may be used to conduct the heating step.

The heating step is conducted for a period of time sufficient to strip off the undesired organic solvent. In general, the heating time can vary from minutes to several hours. If the more sluggish reaction conditions are selected, then the reaction time will have to be extended until the desired product mixture is produced. It is appreciated that the residence time of the reaction mixture will be influenced by the heating temperature, reaction pressure, and choice of solvent. Desirably, the heating step is conducted for a period of from about 15 minutes to about 2 hours.

Upon completion of the heating step, the desired mixture of high molecular weight antiozonants is isolated. The method of isolation is conventional and well known to those skilled in the art and may consist merely of pouring the heated and stripped basic reaction mixture into a crystallizing dish and permitting the reaction mixture to cool for subsequent use. The isolated reaction product of the multi-step process contains a mixture of high molecular weight amine antiozonants. It is believed that this molecular weight distribution contributes to the benefits of the present invention and in fact, those having the higher molecular weight contributes to the low volatility of the amine antiozonants.

Various polymers may be stabilized by use of the present invention. In particular, the antiozonant of the present invention may be used with sulfur vulcanizable elastomers. The term "sulfur vulcanizable elastomers or rubber" as used herein embraces both natural and all its various low and reclaim forms as well as various synthetic rubbers. Representative synthetic polymers are the homopolymerization products of butadiene and its homologues and derivatives, as for example, methylbutadiene, dimethylbutadiene and pentadiene as well as copolymers such as those formed from butadiene or its homologues or derivatives with other unsaturated organic compounds. Among the latter are acetylene e.g. vinyl acetylene; olefins, for example, isobutylene, which copolymerizes with isoprene to form butyl rubber; vinyl compounds, for example vinylchloride, acrylic acid, acrylonitrile (which polymerize with butadiene to form NBR), methacrylic acid and styrene, the latter compound polymerizing with butadiene to form SBR as well as vinyl esters and various unsaturated aldehydes, ketones and ethers, e.g., acrolein, methyl isopropenyl ketone and vinylethyl ether. Also included are the various synthetic rubbers prepared by the homopolymerization of isoprene and the copolymerization of isoprene with other diolefins and various unsaturated organic compounds. Also included are the synthetic rubbers such as 1,4-cis polybutadiene and 1,4-cis polyisoprene and similar synthetic rubbers such as EPDM. The preferred rubbers for use with the high molecular weight amine containing antiozonants are polybutadiene, butyl rubber, EPDM, butadiene-styrene copolymers and 1,4-cis-polyisoprene.

The high molecular weight antiozonant of the present invention may be compounded in either productive (containing cure package including as sulfur) or nonproductive stock. Incorporation of the ester into the polymer may be accomplished by conventional means of mixing such as by the use of Banburys, Brabenders, etc.

The amine antiozonants of the present invention may be used in a wide variety of proportions in the above polymers. These amine antiozonants may be a substituted, in whole or in part, for conventional antiozonants. Generally, the level of amine antiozonants that may be added to polymer compositions may range from about 0.25 to about 10.0 parts per hundred parts of polymer. Preferably, the amount of amine antiozonants that is used ranges from about 0.5 to about 8.0 parts per hundred polymer.

The rubber compositions containing the amine antiozonants find utility in, for example, tires, motor mounts, rubber bushings, power belts, printing rolls, rubber shoe heels and soles, rubber floor tiles, caster wheels, elastomer seals and gaskets, conveyor belt covers, wringers, hard rubber battery cases, automobile floor mats, mud flaps for trucks, ball mill liners, and the like. Preferably, the rubber compositions containing the amine antiozonants are used in tire applications including for use in treads, sidewalls, apex and chafers.

In addition to the amine antiozonants of the present invention, other rubber additives may also be incorporated in the rubber. The additives commonly used in rubber vulcanizates are, for example, carbon black, tackifier resins, processing aids, antiozonants, fatty acids, activators, waxes, oils and peptizing agents.

By class, representative of the conventional antioxidants and antiozonants (commonly classified together as antidegradants) which may be used include monophenols, bisphenols, thiobisphenols, thioalkylphenols, polyphenols, hydroquinone derivatives, phosphates, thioesters, naphthylamines, diphenylamines and other diarylamine derivatives, para-phenylenediamines and quinolines.

As known to those skilled in the art, depending on the intended use of the sulfur vulcanizable material, certain additives mentioned above are commonly used in conventional amounts. Typical additions of carbon black comprise about 20 to 100 parts by weight of diene rubber (phr), which for many tire applications is generally from about 40 to 70 phr. Typical amounts of tackifier resins comprise about 2 to 10 phr. Typical amounts of processing aids comprise about 1 to 8 phr. Typical amounts of antioxidants comprise 1 to about 5 phr. Typical amounts of antiozonants comprise 1 to about 5 phr. Typical amounts of fatty acids such as stearic acid, oleic acid and the like comprise from about 1 to about 2 phr. Typical amounts of zinc oxide comprise 3 to 5 phr. Typical amounts of waxes comprise 1 to 5 phr. Typical amounts of processing oils comprise 5 to 50 phr. Typical amounts of peptizers comprise 0.1 to 1 phr.

The vulcanization of the rubber containing the mixture of high molecular weight antiozonant is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to 8 phr with a range of from 1.0 to 3.0 being preferred.

Accelerators are generally used in rubber compositions to control the time and/or temperature required for vulcanization and to improve the properties of the vulcanizate. In some cases, a single accelerator system is used, i.e., primary accelerator. Conventionally, a primary accelerator is used in amounts ranging from about 0.5 to 2.0 phr. In many other cases, combinations of two or more accelerators are used which may consist of a primary accelerator which is generally used in the larger amount (0.5 to 2.0 phr), and a secondary accelerator which is generally used in smaller amounts (0.05–0.50 phr) in order to activate and to improve the properties of the vulcanizate. Combinations of these accelerators have been known to produce a synergistic effect of the final properties and are somewhat better than those produced by use of either accelerator alone. In addition, delayed action accelerators may be used which are not affected by normal processing temperatures but produce satisfactory cures at ordinary vulcanization temperatures. Suitable types of accelerators that may be used include amines, disulfides, guanidines, thioureas, thiazoles, thiurams, sulfenamides, dithiocarbamates and xanthates. Preferably, the primary accelerator is a sulfenamide. If a secondary accelerator is used, the secondary accelerator is preferably a guanidine, dithiocarbamate or thiuram compound.

The following examples are presented in order to illustrate but not limit the present invention.

EXAMPLE 1

Into a 1 liter, 3 necked flask equipped with a heating mantle, mechanical stirrer, dropping funnel, a Claissen adaptor with a thermometer fitted to a Dean Stark trap connected to a water condenser were charged 67 grams (0.25M) of N-(1,3-dimethylbutyl)-N'-phenyl-p-phenylenediamine, 1.0 grams of xylene sulfonic acid and 125 grams of toluene. The above mixture was heated to 44° C. to make solution with stirring and 26 grams of 37% formalin (1.25M of formaldehyde) was added and stirred one-half hour at 44° C. to 38° C. The molar ratio of formaldehyde to amine was 1.25:1. The mixture was slowly heated with stirring over a 2 hour period at 38° to 83° C. The above reaction mixture was then stirred an extra 45 minutes taking off water of reaction at 83° C. to 110° C. pot temperature (all water of reaction ceased coming over). The above reaction mixture was then cooled to 95° C. and 2.0 grams of $Na_2CO_3$ in 20 grams water (as a solution) were added and stirred one-half hour at 95° C. to 75° C. The water layer was allowed to settle and was removed. The toluene reaction product solution was heated to remove the last trace of water and filtered hot through a polypropylene mat filler at approximately 90° to 100° C. and stripped to 196° C. pot temperature and 27 mm pressure in vacuum. 71 grams of very black and hard resin were obtained. GPC analysis using a polystyrene standard in tetrahydrofuran using a refractive index detector indicated the following apparent molecular weight ranges in THF:

| Molecular Weight | Area % |
|---|---|
| 13128 | 35.0 |
| 3861 | 40.1 |
| 722 | 14.9 |
| 365 | 9.9 |

EXAMPLE 2

The conditions and procedure of Example 1 was repeated except 13 grams of 37% formalin (0.625M of formaldehyde based on 1.0M of the amine) were added. The product was stripped in vacco at 172° C. pot temperature and 27 mm pressure. 67 grams of very dark product were obtained. GPC analysis indicated the apparent molecular weight ranges in THF:

| Molecular Weight | Area % |
|---|---|
| 2253 | 59.2 |
| 645 | 20.2 |
| 360 | 20.6 |

EXAMPLE 3

The conditions and procedure of Example 1 were repeated except 56.5 grams (0.25M) of N-(2-methylethyl)-N'-phenyl-p-phenylenediamine, 1.0 grams of xylene sulfonic acid and 125 grams of toluene were heated with stirring to 45° C. 26.0 grams of 37% formalin (1.25M of formaldehyde based on 1.0 mole of the amine) were added and the above was heated with stirring over a 2 hour period at 45° to 83° C. The reaction mixture was reacted over a ¾ hour period at 84° C. to 110° C. until all water of reaction stopped coming over. The product was worked up as in Example 1 and stripped in vacco at 176° C. pot temperature and 22 mm pressure. 60.5 grams of very dark and very hard resin were obtained. GPC analysis indicated the following apparent molecular weight ranges in THF:

| Molecular Weight | % Area |
|---|---|
| 2033 | 2.5 |
| 1040 | 67.4 |
| 621 | 30.0 |

EXAMPLE 4

The conditions and procedure of Example 1 were repeated except 56.5 grams (0.25 moles) of N-(2-methylethyl)-N'-phenylene-p-phenylenediamine, 1.0 grams of xylene sulfonic acid and 125 grams of toluene were heated to 60° C. to make solution. 11.3 grams of 37% formalin (0.55 moles of formaldehyde based on 1.0 moles of the amine) were added and the mixture was slowly heated over a ½ hour period to 84° C. The reaction mixture was stirred 3 hours at 84° C. and then reacted over a ¾ hour period at 85° to 112° C. pot temperature until all water of reaction stopped coming over. The reaction mixture was worked up as in Example 1 and stripped in vacco at 184° C. and 25 mm pressure. 59 grams of reaction product were obtained. GPC analysis indicated the following apparent molecular weight ranges in THF:

| Molecular Weight | % Area |
|---|---|
| 1067 | 36.7 |
| 799 | 15.9 |
| 503 | 22.1 |
| 299 | 25.3 |

EXAMPLE 5

The conditions and procedure of Example 1 were repeated except after heating to 55° C. to make the solution, the toluene solution was cooled to 8° C. and 14 grams of 99% acetaldehyde (1.25M based on 1.0 mole of the amine) were added with stirring. The temperature rose from 8° to 12° C. After stirring 5 minutes at 12° C., the reaction mixture was slowly heated from 12° C. to 26° C. and stirred an extra 15 minutes at 26° C. The temperature was increased from 26° to 86° C. over a one-half period and stirred 3 hours at 86° C. The reaction temperature was increased to a pot temperature of 115° C. over 1 hour of stirring and until all water of reaction was collected and worked up as in Example 1. The reaction product was stripped to 178° C. pot temperature and 22 mm pressure in vacco. 75 grams of very dark viscous reaction product were obtained. GPC analysis indicated in following apparent molecular weight ranges in THF:

| Molecular Weight | Area % |
| --- | --- |
| 1064 | 13.3 |
| 728 | 18.0 |
| 357 | 68.0 |

EXAMPLE 6

The conditions and procedure of Example 1 was repeated except 56.5 grams of N-(2-methylethyl)-N'-phenyl-p-phenylenediamine, 1.0 grams of toluene sulfonic acid and 125 grams of toluene was heated to 65° C. to make a solution with stirring and cooled to 8° C. 14.0 grams of 99% acetaldehyde (1.25M based on 1.0 mole of the amine) were added. The temperature went from 8° to 12° C. The reaction mixture was stirred 5 minutes at 12° C. and stirred ¾ hour at 12° C. to 28° C. The reaction mixture was heated over a ½ hour period at 28° C. to 86° C. and stirred and extra 2 hours at 86° C. The reaction was heated to a pot temperature of 114° C. over a 1 ¼ hour period until all water of reaction stopped coming over. The reaction was worked up as in Example 1. The reaction mixture was then stripped in vacuum to 178° C. pot temperature and 22 mm pressure. 65 grams dark viscous reaction product were obtained. GPC analysis indicated the following apparent molecular weight ranges in THF:

| Molecular Weight | Area % |
| --- | --- |
| 814 | 13.9 |
| 566 | 15.7 |
| 296 | 70.4 |

EXAMPLE 7

The conditions and procedure of Example 1 were repeated except 56.5 grams of N-(2-methylethyl)-N'-phenyl-p-phenylenediamine, 1.0 grams of toluene sulfonic acid and 125 grams of toluene were heated with stirring to 65° C. to make a solution and cooled to 10° C. 7.0 grams of 99% acetaldehyde were added (0.625M based on 1.0M amine), and the mixture increased from a temperature of 10° to 14° C. The reaction mixture was stirred 5 minutes at 14° C. and slowly heated to 24° C. over a 15 minute period. The reaction mixture was stirred 15 minutes at 24° C. and slowly heated (½ hour period) to 91° C. and stirred an extra 3 hours at 91° to 89° C. The reaction mixture was then reacted over a 50 minute period to a 114°–115° C. pot temperature until all water of reaction stopped coming over. The reactants were worked up as in Example 1 and the above was stripped in vacuum to 185° C. pot temperature and 18 mm pressure.

61 grams of black, very viscous oil were obtained. GPC analysis indicated the following molecular weight ranges in THF:

| Molecular Weight | Area % |
| --- | --- |
| 793 | 5.9 |
| 561 | 9.1 |
| 298 | 82.7 |

EXAMPLE 8

The procedure and conditions of Example 1 were used, except 335 grams of N-(1,3-dimethylbutyl-N'-phenyl-p-phenylenediamine, 5.0 grams of xylene sulfonic acid and 600 grams of toluene were heated and stirred to 55° C. under a N$_2$ atmosphere. 77 grams of 37% formalin (0.75M formaldehyde based on 1.0M the amine) were added to the solution at 55° C. and stirred for ½ hour at 55° to 70° C. The reaction mixture was reacted for 2 hours at 70° C. to 108° C. until all water of reaction stopped coming over. The work up was as in Example 1 using an excess sodium carbonate in water. The reaction mixture was stripped in vacuum to 192° C. pot temperature at 25 mm pressure. 353 grams of reaction product were obtained (dark black hard resinous solids). GPC analysis indicated the following molecular weight ranges in THF:

| Molecular Weight | Area % |
| --- | --- |
| 2935 | 30.5 |
| 1850 | 30.9 |
| 777 | 20.1 |
| 452 | 18.6 |

EXAMPLE 9

The conditions and procedure of Example 8 were repeated except 2.0 grams of xylene sulfonic acid as used. The product was stripped to 190° C. pot temperature and 25 mm pressure. 350 grams of reaction product were obtained. GPC analysis indicated the following molecular weight ranges in THF:

| Molecular Weight | Area % |
| --- | --- |
| 1103 | 8.8 |
| 750 | 26.2 |
| 448 | 65.0 |

EXAMPLE 10

The conditions and procedure of Example 8 were repeated except 1.0 grams of xylene sulfonic acid and 96 grams of 37% formalin (0.938M of formaldehyde based on weight of the amine) was used. The product was stripped at 192° C. pot temperature and 25 mm pressure. 349 grams of reaction product were obtained. The reaction product did not solidify at room temperature.

EXAMPLE 11

The conditions and procedure of Example 1 were repeated except 335 grams of N-(1,3-dimethylbutyl)-N'-phenyl-p-phenylenediamine, 8.8 grams of xylene sulfonic acid and 500 grams of toluene were heated and stirred to 45° C. 130 grams of 37% formalin (1.25M of formaldehyde based on 1.0M of the amine) were added and stirred 15 minutes to a temperature of from 45° to 49° C. The reaction mixture was heated to 49° to 112° C. over a 2 hour period until all water of reaction came over. The work up was as in Example 1 using 9 grams of sodium carbonate in 71 ml water. The reaction mixture was stripped to a 195° C. pot temperature and 14 mm pressure. 350 grams very dark and brittle resin were obtained. Data from the GPC analysis is provided in Example 14.

EXAMPLE 12

The conditions and procedure of Example 1 were repeated except 335 gram of N-(1,3-dimethylbutyl)-N'-phenyl-p-phenylenediamine, 5.0 grams of xylene sulfonic acid and 625 grams of toluene was heated and stirred to 45° C. 130 grams of 37% formalin (1.25M of formaldehyde based on 1.0M the amine) were added and stirred ½ hour at 45° to 40° C. The reaction mixture was slowly heated (½ hour) to 83° C. and stirred 2 hours at 83° C. The mixture was heated over a 3 ¼ hour period at 83° C. to 110.5° C. pot temperature until all water of reaction stopped coming over. The work up was as in Example 1 using 5.0 grams of sodium carbonate in 31 ml of water. The mixture was stripped in vacuum to 182° C. pot temperature and 12 mm pressure. 355 grams of dark and brittle resin were obtained. Data from the GPC analysis is provided in Example 14.

EXAMPLE 13

The conditions and procedure of Example 12 were repeated using 600 grams of toluene and 65 grams of 37% formalin (0.625 moles of formaldehyde based on 1.0M the amine). The mixture was maintained 2 hours at 83° C. The time of the azeotrope was 1 hour and 5 minutes. The mixture was worked up like in Example 12 and stripped in vacuum to a 181° C. pot temperature and 11 mm pressure. 347 grams very dark and somewhat tacky resin were obtained. Data from the GPC analysis is provided in Example 14.

EXAMPLE 14

The procedure and conditions of Example 13 were repeated except 95 grams of 37% formalin (0.938M formaldehyde based on 1.0M the amine) were added at 45° C. The work up was the same as in Example 12. The mixture was stripped in vacuum to 184° C. pot temperature and 12 mm pressure. 350 grams of very dark and brittle resin were obtained. GPC analysis of Examples 11-14 were run using polystyrene standards. The number average molecular weight (Mn), weight average molecular weight (Mw), and the molecular weight distribution (Poly D or Mw/Mn) were determined.

| Example | Mw | Mz | Mn | Poly D |
|---|---|---|---|---|
| 11 | 4604 | 10225 | 1682 | 2.7365 |
| 12 | 3601 | 7222 | 1619 | 2.2245 |
| 13 | 1466 | 2213 | 1002 | 1.4632 |
| 14 | 2228 | 3766 | 1271 | 1.7528 |

EXAMPLE 15

Rubber compositions containing natural rubber, cis-polybutadiene (BUDENE ® 1207), carbon black, processing aids and a sulfur accelerated cure system typical of a tire sidewall were prepared in a laboratory Banbury using two separate stages of addition. The sulfur and accelerator were added to the Banbury in the second stage, whereas the processing aids were added to the first pass along with the rubbers and carbon black. Different amounts of antiozonant (Santoflex TM 13) or the reaction product of Examples 12-14 were added during the first stage of mixing. Santoflex TM 13 is N-phenyl-N'-(1,3-dimethylbutyl)-p-phenylenediamine marketed by Monsanto. Table I sets out the vulcanizate properties of the rubber compounds. The only difference in composition of the rubber compounds is indicated in Table I.

The effect of increasing the level of the N-1,3-dimethylbutyl-N'-phenyl-p-phenylenediamine (Santoflex 13) antiozonant on cure behavior and cured properties is shown by comparing compounds A, B and C. The most dramatic effect is shown when comparing static and dynamic ozone resistance. As the level is increased from 1 phr (compound A) to 3 phr (compound C) the samples exhibit numerous large ozone cracks to no cracks on the sample surface after static testing and numerous large cracks to edge cracking only after dynamic testing. The addition of the higher molecular weight product from Example 13 at the 5 phr level (compound D) provides both static and dynamic ozone protection equivalent to compound C which contains 5 phr of the lower molecular weight Santoflex 13. The higher molecular weight product will have the advantage of lower volatility and thus better persistence in the cured compound as compared to the lower molecular weight Santoflex TM 13. The higher molecular weight product of Example 14 when used at 5 phr (compound G) provides static ozone protection equivalent to the Santoflex TM 13 at 5 phr (compound C), but has slightly inferior dynamic ozone protection when compared with the Santoflex TM 13 at the 5 phr level. The higher molecular weight product of Example 12 does not provide static or dynamic ozone protection (compound H), comparable to the Santoflex TM 13 at the 5 phr level (compound C).

EXAMPLE 16

Rubber compositions containing natural rubber, cis-polybutadiene (BUDENE ® 1907), carbon black, processing aids and a sulfur accelerated cure system typical of a tire sidewall were prepared in a laboratory Banbury using two separate stages of addition. The sulfur and accelerator were added to the Banbury in the second stage, whereas the processing aids were added to the first pass along with the rubbers and carbon black. The only difference in composition of the rubber compounds is indicated in Table II.

Santoflex TM 13 and the reaction product of Example 13 are compared at 5 phr of each (compounds I and K) and also as a blend of 2.5 phr of each (compound K). These results clearly indicate that a mixture of the lower molecular weight Santoflex TM 13 and the higher molecular weight reaction product of Example 13 can be used in a blend to provide good cured properties and adequate ozone protection.

TABLE I

| Compound | A | B | C | D | E | F | G | H |
|---|---|---|---|---|---|---|---|---|
| Santoflex TM 13 (phr) | 1.0 | 3.0 | 5.0 | 0 | 0 | 0 | 0 | 0 |
| Product of Example 13 (phr) | 0 | 0 | 0 | 5.0 | 0 | 0 | 0 | 0 |
| Product of Example 14 (phr) | 0 | 0 | 0 | 0 | 1.0 | 3.0 | 5.0 | 0 |
| Product of Example 12 (phr) | 0 | 0 | 0 | 0 | 0 | 0 | 0 | 5.0 |
| Rheometer, 150° C. ASTM D2084 | | | | | | | | |
| Maximum Torque | 33.5 | 32.4 | 31.8 | 30.9 | 33.4 | 32.0 | 30.8 | 30.3 |
| Minimum Torque | 9.2 | 8.9 | 8.4 | 8.6 | 9.2 | 8.8 | 8.6 | 8.8 |
| t90, minutes | 25.9 | 24.0 | 21.9 | 22.8 | 27.6 | 25.8 | 24.4 | 27.1 |
| t25, minutes | 9.4 | 8.6 | 8.0 | 8.1 | 9.8 | 9.2 | 8.8 | 9.6 |
| Stress-Strain ASTM D412 | | | | | | | | |
| Tensile Strength (MPa) | 13.5 | 13.7 | 13.5 | 12.2 | 12.7 | 12.6 | 12.5 | 12.6 |

TABLE I-continued

| Compound | A | B | C | D | E | F | G | H |
|---|---|---|---|---|---|---|---|---|
| Elongation at Break, % | 577 | 609 | 614 | 653 | 574 | 637 | 682 | 710 |
| 300% Modulus (MPa) | 6.4 | 6.0 | 5.8 | 4.9 | 6.0 | 5.3 | 4.7 | 4.5 |
| DeMattia Flex | | | | | | | | |
| Pierced (.08"), 6 hrs. flex | 2 | 3 | 2 | 2 | 3 | 2 | 3 | 5 |
| Crack length in 32nds inch | | | | | | | | |
| Static Ozone* | D4 | A3 | 0 | 0 | F | B3 | 0 | F |
| 20% Strain, 48 hours | | | | | | | | |
| Dynamic Ozone* | D3 | E | E | E | F | D2 | D2 | D3 |
| 25% Strain, 48 hours | | | | | | | | |
| Rheovibron | | | | | | | | |
| E' @ 60° C. (MPa) | 6.3 | 6.0 | 6.3 | 6.8 | 7.2 | 7.2 | 7.4 | 7.7 |
| Tan Delta @ 60° C. | .12 | .13 | .13 | .13 | .14 | .13 | .13 | .13 |
| Hardness | 51 | 50 | 50 | 49 | 51 | 49 | 48 | 48 |
| Shore A, 100° C. | | | | | | | | |
| Rebound ASTM D1054 | 65.5 | 66.9 | 67.2 | 63.4 | 64.6 | 64.2 | 62.6 | 59.9 |
| %, 100° C. | | | | | | | | |
| Adhesion | 93 | 84 | 81 | 110 | 103 | 104 | 119 | 134 |
| Peel Adhesion to Itself | | | | | | | | |
| (Newtons/Inch) | | | | | | | | |

*Ozone Rating System
0 = No cracking
E = Edge cracking only
F = Failure

Number of Cracks
A = very few (less than ¼ surface)
B = few (¼ to ½ surface)
C = moderate (½ to ¾ surface)
D = heavy (¾ to all surface)

Size of Cracks
1 = small (hairline)
2 = medium
3 = large
4 = severe (open)

TABLE II

| Compound | I | J | K |
|---|---|---|---|
| Santoflex TM 13 (phr) | 5.0 | 2.5 | 0 |
| Product of Example 13 (phr) | 0 | 2.5 | 5.0 |
| Rheometer, 150° C. | | | |
| Maximum Torque | 34.8 | 35.3 | 35.4 |
| Minimum Torque | 8.7 | 8.8 | 8.8 |
| t90, minutes | 13.1 | 13.2 | 12.7 |
| t25, minutes | 8.1 | 8.3 | 8.1 |
| Stress-Strain | | | |
| Tensile Strength, MPa | 16.9 | 17.2 | 16.4 |
| Elongation at Break, % | 614 | 641 | 650 |
| 300% Modulus, MPa | 6.4 | 6.1 | 5.8 |
| Static Ozone | C3 | C3 | C4 |
| 20% Strain, 48 hours | | | |
| Dynamic Ozone | E | E | E |
| 25% Strain, 48 hours | | | | nant is expressed as parts by weight per 100 parts by weight of the rubber.

The oxygen absorption tests were conducted by dissolving in toluene portions of the compounded SBR. The cements so formed were poured onto aluminum foil so as to form a thin film. After drying, the weight of the rubber was obtained in connection with each sample. Thereafter, the foil with the adhering rubber strip was placed in the oxygen absorption apparatus. The time required for each sample to absorb 1.0, 2.0 and 3.0 percent oxygen was determined and recorded in the following Table IV. This testing procedure is described in further detail in Industrial and Engineering Chemistry, 43, p. 456 (1951) and Industrial and Engineering Chemistry, 45, p. 392 (1953).

TABLE III

| Sample | Antiozonant | Parts | Hours to 1% Oxygen Absorption @ 100° C. | Hours to 2% Oxygen Absorption @ 100° C. | Hours to 3% Oxygen Absorption @ 100° C. |
|---|---|---|---|---|---|
| 1 (Control) | Wingstay ® 300 | 0.5 | 566 | 892 | 997 |
| 2 | Example 1 | 0.5 | 633 | 856 | 918 |
| 3 | Example 2 | 0.5 | 523 | 973 | 1090 |
| 4 (Control) | Wingstay ® 300 | 1.0 | 331 | 974 | 1325 |
| 5 | Example 1 | 1.0 | 423 | 1076 | 1326 |
| 6 | Example 2 | 1.0 | 448 | 1158 | 1375 |
| 7 (Control) | MEPD[1] | 0.5 | 605 | 908 | 990 |
| 8 | Example 3 | 0.5 | 621 | 870 | 990 |
| 9 (Control) | MEPD[1] | 1.0 | 368 | 1073 | 1480 |
| 10 | Example 3 | 1.0 | 494 | 1110 | 1274 |

(1) N-phenyl-N'-(1-methylethyl)-p-phenylenediamine

OXYGEN ABSORPTION

An antiozonant free styrene-butadiene rubber (Plioflex ® 1712) was compounded with antiozonants of the present invention. The Plioflex ® 1712 is commercially available from The Goodyear Tire & Rubber Company. For purposes of comparison, various commercially available antiozonants were also compounded. Various parts by weight of the antiozonants were used in the Oxygen Absorption study. The level of each antiozo-

What is claimed is:

1. A process for decreasing the degradation of a diene containing rubber comprising admixing a rubber selected from the group consisting of natural rubber, homopolymers of conjugated diolefins, copolymers of conjugated diolefins and ethylenically unsaturated monomers or mixtures thereof with the reaction product of a multistep process comprising:

(1) reacting under condensation conditions reactants consisting of an aldehyde and an amine containing compound to form a condensation product wherein said aldehyde is selected from the group consisting of formaldehyde, acetaldehyde or mixtures thereof; and said amine containing compound is selected from the group consisting of:

N,N'-di-substituted-p-phenylene diamines of the structural formula:

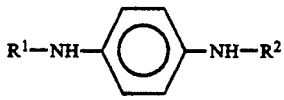

wherein $R^1$ and $R^2$ are independently selected from the group of radicals consisting of alkyls having 3 to 12 carbon atoms, aryls having 6 to 12 carbon atoms and aralkyls having 7 to 12 carbon atoms; and wherein said condensation conditions include:

(i) the presence of an acid catalyst,
(ii) a mole ratio of aldehyde to amine containing compound ranging from about 1.01:2 to 2:1, and
(iii) said amine containing compound is dissolved in an organic solvent;

(2) removing the water of reaction from said condensation product;

(3) adjusting the pH of the condensation reaction product to above 7 to form a basic reaction mixture;

(4) filtering off neutralized catalyst to form a solvent reaction mixture;

(5) heating said solvent reaction mixture under vacuum to a temperature ranging from about 110° C. to 250° C.;

(6) isolating from the heated solvent reaction mixture the reaction product derived solely from said aldehyde and said amine and wherein said reaction product exhibits antiozonant activity in diene containing rubbers.

2. The process of claim 1 wherein said reaction product is added in an amount ranging from about 0.5 phr to 10 phr of said rubber.

3. The process of claim 1 wherein the aldehyde is formaldehyde.

4. The process of claim 1 wherein $R^1$ is an aryl having 6 carbon atoms and $R^2$ is an alkyl having 6 carbon atoms.

5. The process of claim 1 wherein $R^1$ is an alkyl having 3 carbon atoms and $R^2$ is an aryl having 6 carbon atoms.

6. The process of claim 1 wherein said acid catalyst is selected from the group consisting of sulfuric acid, methane sulfonic acid, hydrochloric acid, xylene sulfonic acid and toluenesulfonic acid.

7. The process of claim 1 wherein said reaction product is an amount ranging from about 0.5 to about 10 phr.

* * * * *